United States Patent [19]

Seya et al.

[11] Patent Number: 4,956,812

[45] Date of Patent: Sep. 11, 1990

[54] WAVELENGTH SELECTIVE OPTICAL RECORDING AND REPRODUCING DEVICE

[75] Inventors: Masatomo Seya; Kazuo Okada; Motomu Yoshimura; Mitsuo Maeda, all of Hyogo, Japan

[73] Assignee: Mitsubishi Denki Kabushiki Kaisha, Tokyo, Japan

[21] Appl. No.: 209,213

[22] Filed: Jun. 20, 1988

[30] Foreign Application Priority Data

Jun. 19, 1987 [JP] Japan .................. 62-154126

[51] Int. Cl.$^5$ ............................................. G11C 13/00
[52] U.S. Cl. .................... 365/119; 365/106; 365/215; 369/106; 372/32
[58] Field of Search ............... 365/119, 106, 120, 121, 365/215; 369/106, 108, 116; 372/28, 29, 32

[56] References Cited

U.S. PATENT DOCUMENTS

| | | | |
|---|---|---|---|
| 4,079,429 | 3/1978 | Travot et al. ................. | 365/121 |
| 4,101,976 | 7/1978 | Castro et al. ................. | 365/119 |
| 4,150,392 | 4/1979 | Johnston, Jr. et al. ........ | 372/32 |
| 4,363,961 | 12/1982 | Okada et al. ................. | 369/45 |
| 4,709,417 | 11/1987 | Kuwabara ..................... | 372/32 |
| 4,819,206 | 4/1989 | Yoshimura .................... | 365/120 |
| 4,833,681 | 5/1989 | Akiyama et al. .............. | 372/32 |
| 4,855,951 | 8/1989 | Tomioka et al. .............. | 365/119 |

*Primary Examiner*—Glenn Gossage
*Attorney, Agent, or Firm*—Oblon, SPivak, McClelland, Maier & Neustadt

[57] ABSTRACT

A wavelength selective optical recording and reproducing device has a reference wavelength in a marker hole of a medium. The optical detector is adapted to detect light which is reflected from or transmitted through the marker hole. A phase detector detects the phase of an output of the optical detector by using a high frequency signal as a reference to obtain a signal indicative of the deviation of the wavelength of the output from a desired wavelength. A wavelength regulator is responsive to the wavelength deviation to control the wavelength of the light source to be the desired wavelength.

4 Claims, 4 Drawing Sheets

FIG. 5
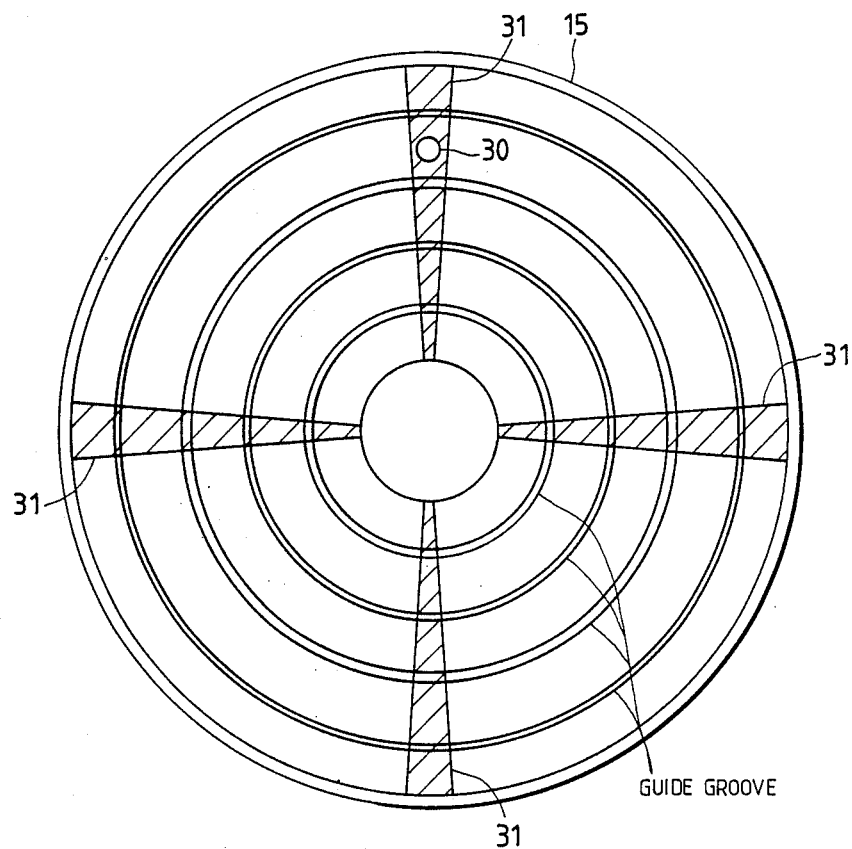
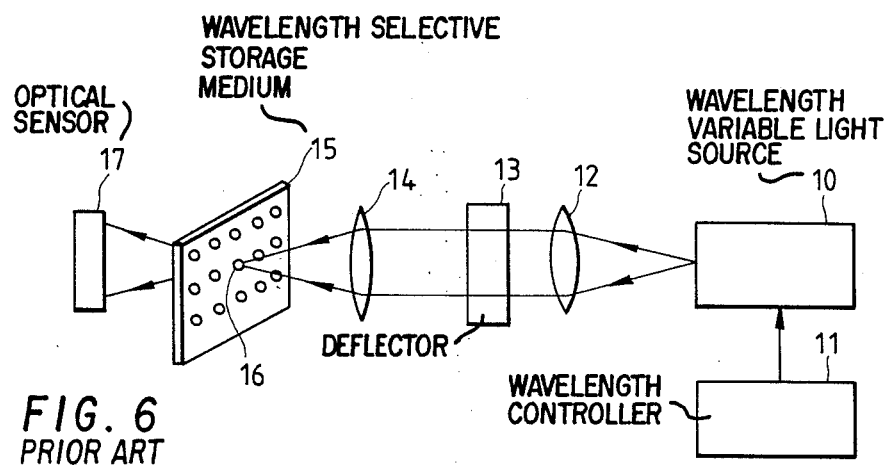
FIG. 6
PRIOR ART

WAVELENGTH SELECTIVE OPTICAL RECORDING AND REPRODUCING DEVICE

BACKGROUND OF THE INVENTION

The present invention relates to a wavelength selective optical recording and reproducing device.

FIG. 6 shows a construction of a conventional such device which is disclosed in U.S. Pat. No. 4,101,976, which corresponds to Japanese Patent Publication (Kokoko) No. 58-51355 and FIG. 7 illustrates the wavelength spectrum of a recording medium having recorded information.

In FIG. 6, reference numeral 10 depicts a wavelength variable light source such as semiconductor laser, 11 a controller for varying the wavelength of the light source 10, 12 a collimating lens for converting the light from the light source 10 into a parallel beam, 13 a deflector, 14 an objective lens for condensing the parallel beam to a minute spot and directing it onto a recordable and reproducible medium 15, 16 one arbitrary memory element of the several memory elements on the medium 15 each of which is shown by a circle in this figure, the arbitrary memory element being selected by the deflector 13, and 17 an optical sensor for sensing light passed through the memory element 16.

In operation, light from the light source 10 is converted by the collimating lens 12 into a parallel beam and condensed by the objective lens 14 to a light spot and directed onto the selected memory element 16 on the medium 15. The selection of the memory element can be performed arbitrarily by means of the deflector 13. The principle of the wavelength selective recording and reproducing at the selected memory element 16 will be described with reference to FIG. 7. A waveform (a) in FIG. 7 is an absorption spectrum of the medium prior to wavelength selective recording, which has a broad spectral characteristic. When the medium is irradiated with lights having intensity spectra such as shown by dotted lines, the absorption curve of the medium is reduced at locations corresponding to peaks of the light spectra as shown by a waveform (b) in FIG. 7. Such absorption is called as a "spectral hole". When a spectral hole occurs, it is given the meaning of a "1" memorized on the medium at a corresponding wavelength. No absorption means that "0" is memorized. In order to produce a spectral hole at an arbitrary wavelength, i.e., to write a data "1" at such wavelength, the wavelength of the light source 10 is made to coincide with the wavelength of the spectral hole to be recorded by means of the wavelength controller 11 and to increase the intensity of the light source 10 up to a value necessary to record. In order to read a signal recorded on the medium and having the wavelength selective record spectrum such as shown by the waveform (b) in FIG. 7, it is enough to scan a wavelength from an upper limit A to a lower limit B while the light intensity of the light source 10 is held constant. Since the degree of absorption is reduced at the wavelength of the spectral hole, a spectrum of light intensity such as shown by a waveform (c) in FIG. 7 can be obtained by detecting the transmission of light through the medium 15 by an optical sensor 17. Although the waveform (c) in FIG. 7 shows the wavelength spectrum, it is possible to obtain at the output of the optical detector 17 a signal which is a function of time obtained by scanning through the wavelengths at a constant rate.

Practically, it is possible to provide several thousands of spectral holes in such a broad spectral range as shown by the waveform (a) in FIG. 7. In order to realize the recording of such a large number of spectral holes, it is necessary to exactly control the absolute wavelength of the light source. However, since the wavelength width of a spectral hole is typically on the order of several tens to several hundreds MHz in frequency, it is very difficult to select a wavelength of light corresponding to a frequency unit in such a range, resulting in some error in the reproduced data.

SUMMARY OF THE INVENTION

An object of the present invention is to provide a wavelength selective optical recording and reproducing device which is capable of reproducing a data highly reliably by controlling a light from a light source to a desired wavelength at the time of reproduction of recorded data.

In the wavelength selective optical recording and reproducing device according to the present invention, a hole position marker indicating of that a spectral hole to be recorded is already written is provided and the wavelength of a light source is controlled by detecting a phase with respect to the marker hole. That is, the light source is frequency-modulated and an output of a detector for detecting the marker hole is detected in phase to control the wavelength of the light source. Therefore, the wavelength of the light source is well controlled to a desired wavelength.

BRIEF DESCRIPTION OF THE DRAWING

FIG. 5 is a plan view of a recording and reproducing medium to be used in the embodiment of the present invention;

FIG. 6 a construction of a conventional wavelength selective optical recording and reproducing device.

DETAILED DESCRIPTION OF THE PREFERRED EMBODIMENT

Figure 1:
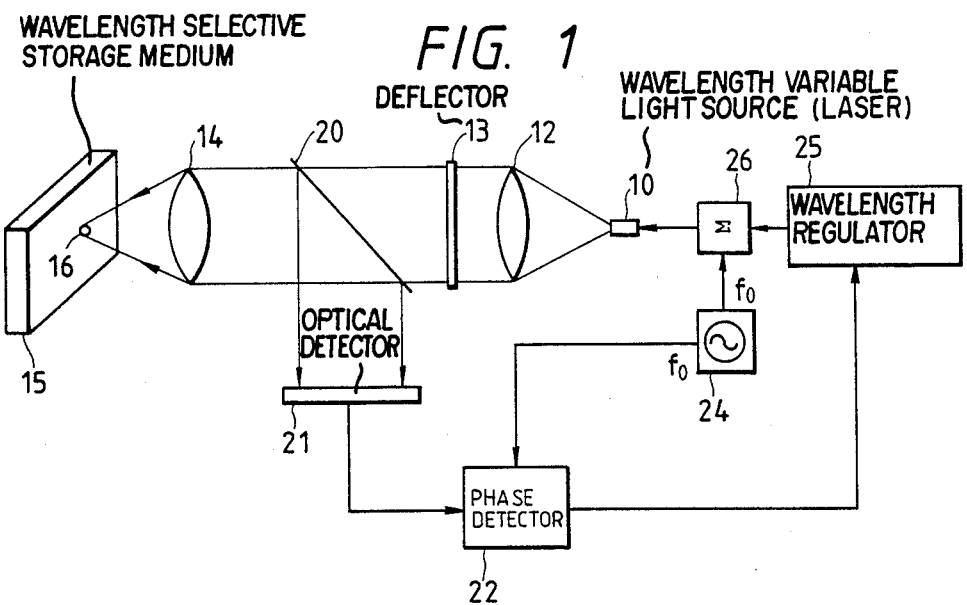
FIG. 1 illustrates a construction of an embodiment of the present invention for explaining a principle of the present invention.

In FIG. 1 which shows an embodiment of the present invention reference numeral 10 depicts a wavelength variable light source such as a semiconductor laser, 12 a collimating lens for converting the light from the light source 10 into a parallel beam, 13 an optical deflector, 14 an objective lens for condensing the parallel beam to a minute spot and irradiating a wavelength selective recording medium 15 with the spot, 16 one memory element on the medium 15 which is selected by the optical deflector 13, 20 a mirror for bending the optical axis of light reflected by the medium 15, 21 an optical detector for detecting the light reflected by the mirror 20, 22 a phase detector for detecting a phase of a signal detected by the optical detector 21, 24 a high frequency oscillator for frequency-modulating a frequency of the light source 10 with a constant frequency $f_o$ and 25 a wavelength regulator for regulating the wavelength of the light source 10. In this embodiment, a semiconductor laser, having a frequency which can be adjusted by a current is used as the light source 10 and, therefore, the wavelength regulator 25 may be a variable voltage D.C. power supply. Further, an adder 26 is included in this embodiment for adding an output of the high frequency oscillator 24 to an output of the wavelength regulator 25.

In operation, a light from the light source 10 is converted to a parallel beam by the collimating lens 12 and condensed by the objective lens 14 to a minute light spot. The latter is directed onto a selected memory element 16 on the medium 15.

Figure 2:
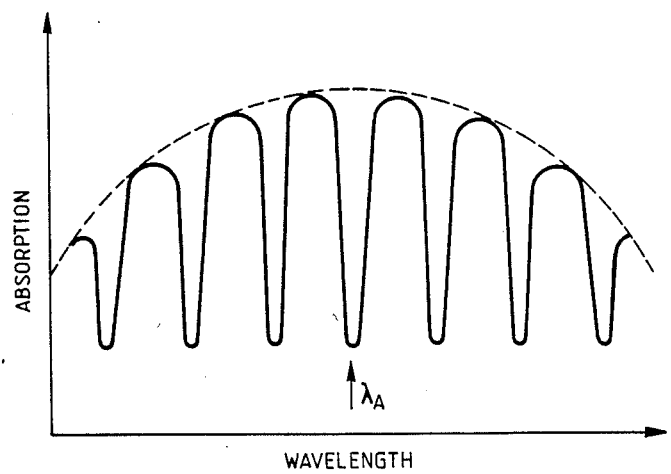
FIG. 2 shows waveforms detectable by an optical detector in FIG. 1.

The reflected light from the medium 15 is bent by the mirror 20 and detected by the optical detector 21 an output of which is shown in FIG. 2.

Figure 3:
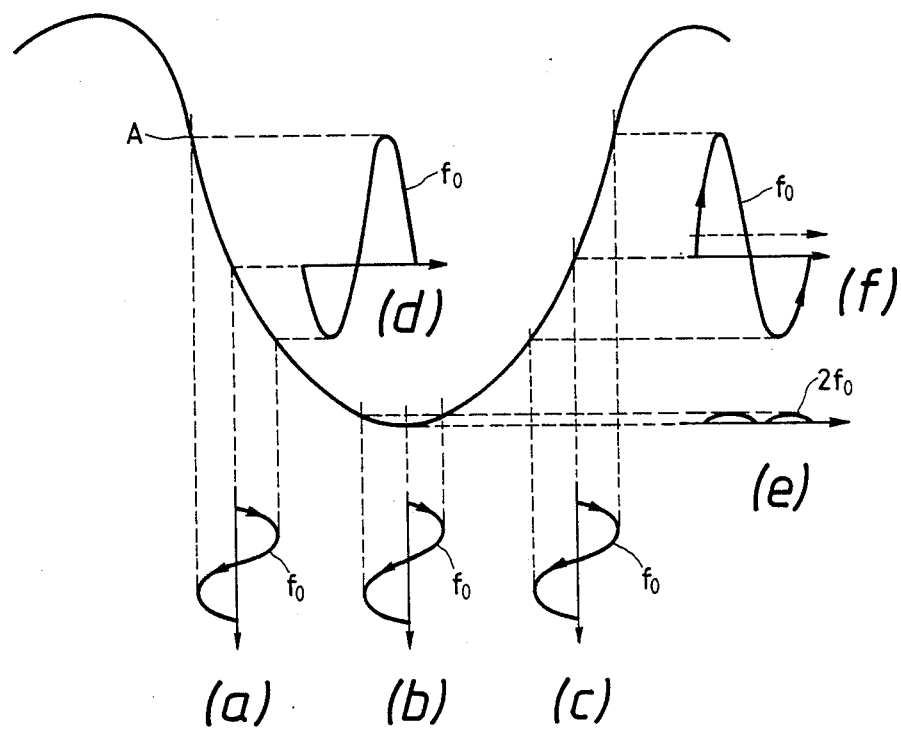
FIG. 3 is an enlarged waveform of a portion in FIG. 2.

It is assumed at this time that the wavelength of the light source 10 is to be controlled exactly to a center frequency of a spectral hole having a wavelength $\lambda_A$ in the spectrum shown in FIG. 2. A curve A in FIG. 3 shows the absorption spectrum of wavelength $\lambda_A$ in FIG. 2. The light from the light source 10 has been modulated with the constant frequency $f_o$ by the high frequency oscillator 24. Therefore, the intensity of the reflected light from the medium 15 which is detected by the optical detector 21, is necessarily modulated to some extent and the modulation may depend upon a deviation of light source wavelength from $\lambda_A$.

Figure 4:
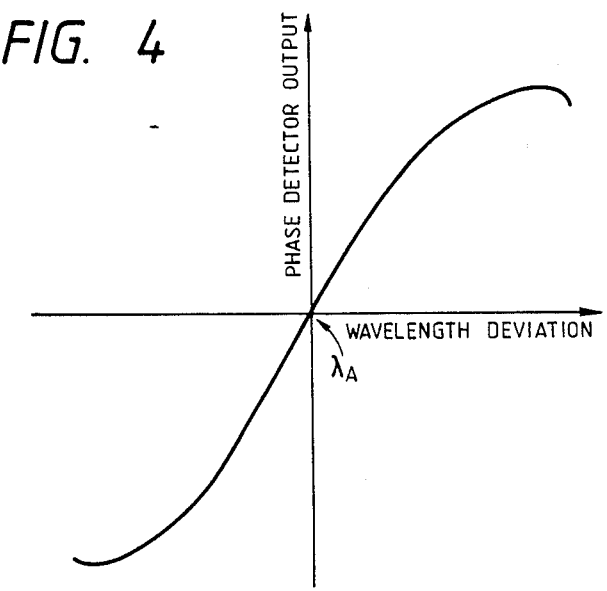
FIG. 4 shows an example of an output signal of a phase detector in FIG. 1.
Figure 7:
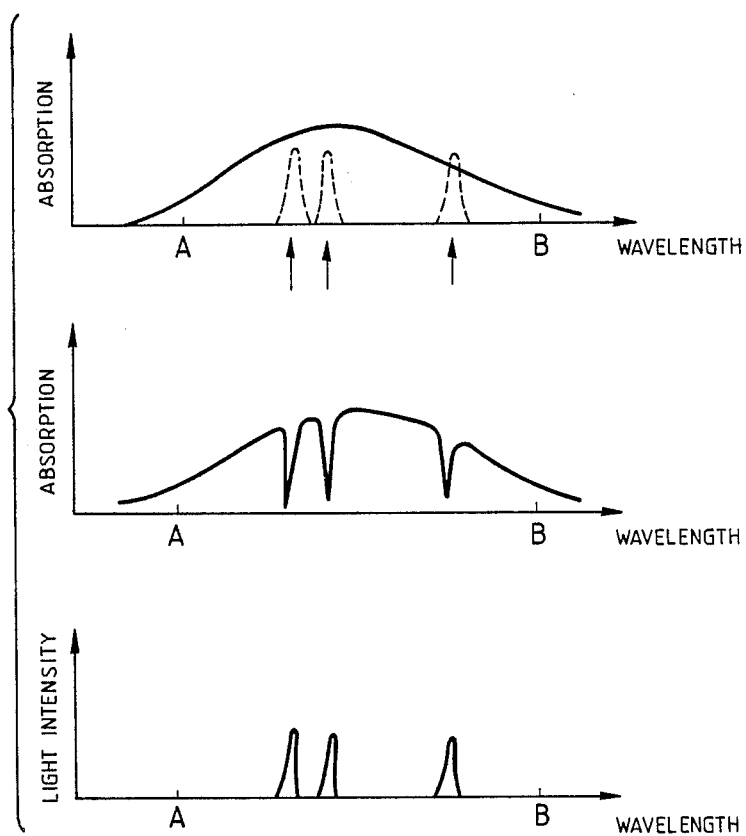
FIG. 7 is a wavelength spectrum of the medium having informations recorded.

Waveforms (b) and (e) in FIG. 3 are a modulating waveform and a modulated waveform, respectively, when the light source wavelength is coincident with the desired wavelength. As is clear from FIG. 3, the frequency of the output waveform (e) is twice that of the modulating frequency. A waveform (c) in FIG. 3 is a case where the light source wavelength is longer than the aimed wavelength. The waveform (c) has a frequency which is the same as the frequency $f_o$ of the oscillator 24 and is in phase with the latter. When the light source wavelength is shorter than the aimed wavelength as shown by a waveform (a) in FIG. 3, the output waveform is modulated with the frequency $f_o$, but the phase is inverted. Therefore, an output such as shown in FIG. 4 is obtained by adding the output of the optical detector 21 to the phase detector 22 and phase-detecting it with the output of the high frequency oscillator 24. By applying this output to the wavelength regulator 25 to perform a servo control, it is possible to make the wavelength of the light source 10 always coincide on the desired hole wavelength $\lambda_A$. Thus, an exact recording and reproducing of information becomes possible.

FIG. 5 shows the medium 15 having coaxial guide grooves formed thereon by which the wavelength control can be performed effectively. In FIG. 5, four marker regions 31 are provided on the medium 15 with an interval of 90°. Markers 30 each including all spectral holes recorded are provided on all of tracks in the respective marker regions 31, so that the marker 30 can be detected four time per revolution of the medium 15.

Although, in this embodiment, the guide grooves are provided coaxially, it is possible to use a spiral guide groove. Further, the number of pits of the marker 30 may be smaller or larger than four.

Since the data can be reproduced by scanning in not the wavelength direction but the positional direction, a reproduction speed can be increased and there is not continuous effect of data produced even if there is defect in one pit.

As mentioned hereinbefore, according to the present invention, a wavelength selective optical recording and reproducing device is provided which is operable at high speed with high reliability, due to the phase detection on the basis of the spectral hole and the wavelength control of the wavelength of the light source according to a deviation of the detected wavelength thereby.

What is claimed is:

1. A wavelength selective optical recording and reproducing device comprising:
    a light source having a variable wavelength;
    a recording and reproducing medium for storing information, said information being selectively retrieved according to the wavelength of light;
    an optical system for condensing light from said light source and illuminating said medium;
    optical detector means for detecting light from said medium, said optical detector producing a data signal when the detected light is at a predetermined wavelength;
    a frequency generator producing a constant frequency signal;
    phase detector means receiving said constant frequency signal and said data signal and producing a phase difference signal in response thereto;
    controller means receiving said phase difference signal and being controlled thereby to produce an output; and
    adder means connected to said light source for adding said constant frequency signal to the output of said controller to produce a signal for controlling the wavelength of said light source.

2. The device according to claim 1, wherein said medium contains a plurality of regions with data being recorded once in each region so that data may be detected a plurality of times per revolution of medium.

3. The device according to claim 2, wherein said medium contains coaxial guide grooves.

4. The device according to claim 2, wherein said medium contains spiral guide grooves.

* * * * *